(12) United States Patent
Endo et al.

(10) Patent No.: US 12,580,434 B2
(45) Date of Patent: Mar. 17, 2026

(54) ROTOR FOR ROTATING ELECTRIC MACHINE AND METHOD OF MANUFACTURING ROTOR

(71) Applicant: DENSO CORPORATION, Kariya-city (JP)

(72) Inventors: Hiroshi Endo, Kariya-city (JP); Nobuo Isogai, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 358 days.

(21) Appl. No.: 18/157,117

(22) Filed: Jan. 20, 2023

(65) Prior Publication Data

US 2023/0275480 A1 Aug. 31, 2023

(30) Foreign Application Priority Data

Jan. 28, 2022 (JP) ................................. 2022-012234

(51) Int. Cl.
*H02K 1/28* (2006.01)
*H02K 1/276* (2022.01)
*H02K 15/03* (2025.01)
*H02K 15/12* (2025.01)

(52) U.S. Cl.
CPC .............. *H02K 1/28* (2013.01); *H02K 1/276* (2013.01); *H02K 15/03* (2013.01); *H02K 15/12* (2013.01)

(58) Field of Classification Search
CPC .......... H02K 1/28; H02K 1/276; H02K 15/03; H02K 15/12
USPC ........................................ 310/156.01, 156.23
See application file for complete search history.

(56) References Cited

U.S. PATENT DOCUMENTS

| | | |
|---|---|---|
| 2017/0302141 A1 | 10/2017 | Yokota et al. |
| 2018/0183286 A1 | 6/2018 | Nakano et al. |
| 2019/0097478 A1 | 3/2019 | Katayama |
| 2019/0103775 A1 | 4/2019 | Kashiwabara et al. |
| 2020/0309320 A1 | 10/2020 | Ueda |
| 2021/0194300 A1 | 6/2021 | Kawano et al. |

FOREIGN PATENT DOCUMENTS

| | | | | |
|---|---|---|---|---|
| CN | 104682593 A | * | 6/2015 | ........... H02K 1/2786 |
| CN | 111541313 A | * | 8/2020 | ............ H02K 1/146 |
| JP | H115000597 A | * | 1/1999 | |
| JP | 2010-183791 A | | 8/2010 | |

(Continued)

*Primary Examiner* — Jose A Gonzalez Quinones
(74) *Attorney, Agent, or Firm* — Oliff PLC

(57) ABSTRACT

A rotor for a rotating electric machine includes a rotor core having a plurality of magnet-receiving holes formed along a circumferential direction, and a plurality of permanent magnets each of which is received in a corresponding one of the magnet-receiving holes of the rotor core. Each of the magnet-receiving holes has a pair of a radially-outer wall surface and a radially-inner wall surface that are radially opposite to each other. Each of the permanent magnets is fixed in the corresponding magnet-receiving hole of the rotor core by a fixing resin that includes a radially outer resin interposed between the permanent magnet and the radially-outer wall surface of the corresponding magnet-receiving hole and a radially inner resin interposed between the permanent magnet and the radially-inner wall surface of the corresponding magnet-receiving hole. An adhesive strength of the radially outer resin is higher than an adhesive strength of the radially inner resin.

9 Claims, 8 Drawing Sheets

(56)         References Cited

FOREIGN PATENT DOCUMENTS

| JP | 2012-139074 | A |   | 7/2012 |
| JP | 2012244838 | A | * | 12/2012 |
| JP | 2014-064406 | A |   | 4/2014 |
| JP | 2015-035888 | A |   | 2/2015 |
| JP | 2015-091192 | A |   | 5/2015 |
| JP | 2015-104273 | A |   | 6/2015 |
| JP | 2015-139231 | A |   | 7/2015 |
| JP | 2018-007483 | A |   | 1/2018 |
| JP | 2019140847 | A | * | 8/2019 |
| JP | 2020-145894 | A |   | 9/2020 |
| JP | 2020-145895 | A |   | 9/2020 |
| JP | 6813009 | B2 |   | 1/2021 |

* cited by examiner

ROTOR FOR ROTATING ELECTRIC MACHINE AND METHOD OF MANUFACTURING ROTOR

CROSS-REFERENCE TO RELATED APPLICATION

This application is based on and claims priority from Japanese Patent Application No. 2022-012234 filed on Jan. 28, 2022, the entire contents of which are hereby incorporated by reference into this application.

BACKGROUND

1 Technical Field

The present disclosure relates to rotors for rotating electric machines and methods of manufacturing the rotors.

2 Description of Related Art

There are known IPM (Interior Permanent Magnet) rotors for rotating electric machines. In the IPM rotors, a plurality of magnet-receiving holes are formed in a rotor core; and a plurality of permanent magnets are received respectively in the magnet-receiving holes. Moreover, there is also known a technique of fixing the permanent magnets in the magnet-receiving holes of the rotor core with a fixing resin. Specifically, according to the technique, each of the magnet-receiving holes of the rotor core has a radially-outer wall surface and a radially-inner wall surface, which are interior wall surfaces of the rotor core defining the magnet-receiving hole. Each of the permanent magnets is fixed in a corresponding one of the magnet-receiving holes of the rotor core by being bonded to the radially-outer and radially-inner wall surfaces of the corresponding magnet-receiving hole by the fixing resin.

SUMMARY

According to the present disclosure, there is provided a rotor for a rotating electric machine. The rotor includes a rotor core having a plurality of magnet-receiving holes formed along a circumferential direction, and a plurality of permanent magnets each of which is received in a corresponding one of the magnet-receiving holes of the rotor core. Each of the magnet-receiving holes has a pair of a radially-outer wall surface and a radially-inner wall surface that are radially opposite to each other. Each of the permanent magnets is fixed in the corresponding magnet-receiving hole of the rotor core by a fixing resin that includes a radially outer resin interposed between the permanent magnet and the radially-outer wall surface of the corresponding magnet-receiving hole and a radially inner resin interposed between the permanent magnet and the radially-inner wall surface of the corresponding magnet-receiving hole. An adhesive strength of the radially outer resin between the permanent magnet and the radially-outer wall surface of the corresponding magnet-receiving hole is higher than an adhesive strength of the radially inner resin between the permanent magnet and the radially-inner wall surface of the corresponding magnet-receiving hole.

According to the present disclosure, there is also provided a method of manufacturing a rotor. The rotor includes a rotor core having a plurality of magnet-receiving holes formed along a circumferential direction, and a plurality of permanent magnets each of which is received in a corresponding one of the magnet-receiving holes of the rotor core. Each of the magnet-receiving holes has a pair of a radially-outer wall surface and a radially-inner wall surface that are radially opposite to each other. The method includes an assembly step, a curing step and a magnetization step. In the assembly step, the permanent magnets in a state of having not been magnetized and a fixing resin in a state of having not been cured are assembled into the magnet-receiving holes of the rotor core so that each of the permanent magnets is received in the corresponding magnet-receiving hole with the fixing resin applied on the radially-outer and radially-inner wall surfaces of the corresponding magnet-receiving hole. In the curing step, the fixing resin in the magnet-receiving holes of the rotor core is cured so that each of the permanent magnets is fixed in the corresponding magnet-receiving hole by the fixing resin that includes a radially outer resin interposed between the permanent magnet and the radially-outer wall surface of the corresponding magnet-receiving hole and a radially inner resin interposed between the permanent magnet and the radially-inner wall surface of the corresponding magnet-receiving hole. In the magnetization step after the curing step, each of the permanent magnets is magnetized by applying a magnetic field to the permanent magnet in a direction perpendicular to both a radially-outer side surface and a radially-inner side surface of the permanent magnet; the radially-outer and radially-inner side surfaces of the permanent magnet respectively face the radially-outer and radially-inner wall surfaces of the corresponding magnet-receiving hole. Furthermore, in the curing step, the fixing resin is cured so that an adhesive strength of the radially outer resin between each of the permanent magnets and the radially-outer wall surface of the corresponding magnet-receiving hole is higher than an adhesive strength of the radially inner resin between each of the permanent magnets and the radially-inner wall surface of the corresponding magnet-receiving hole.

DESCRIPTION OF EMBODIMENTS

Figure 1:
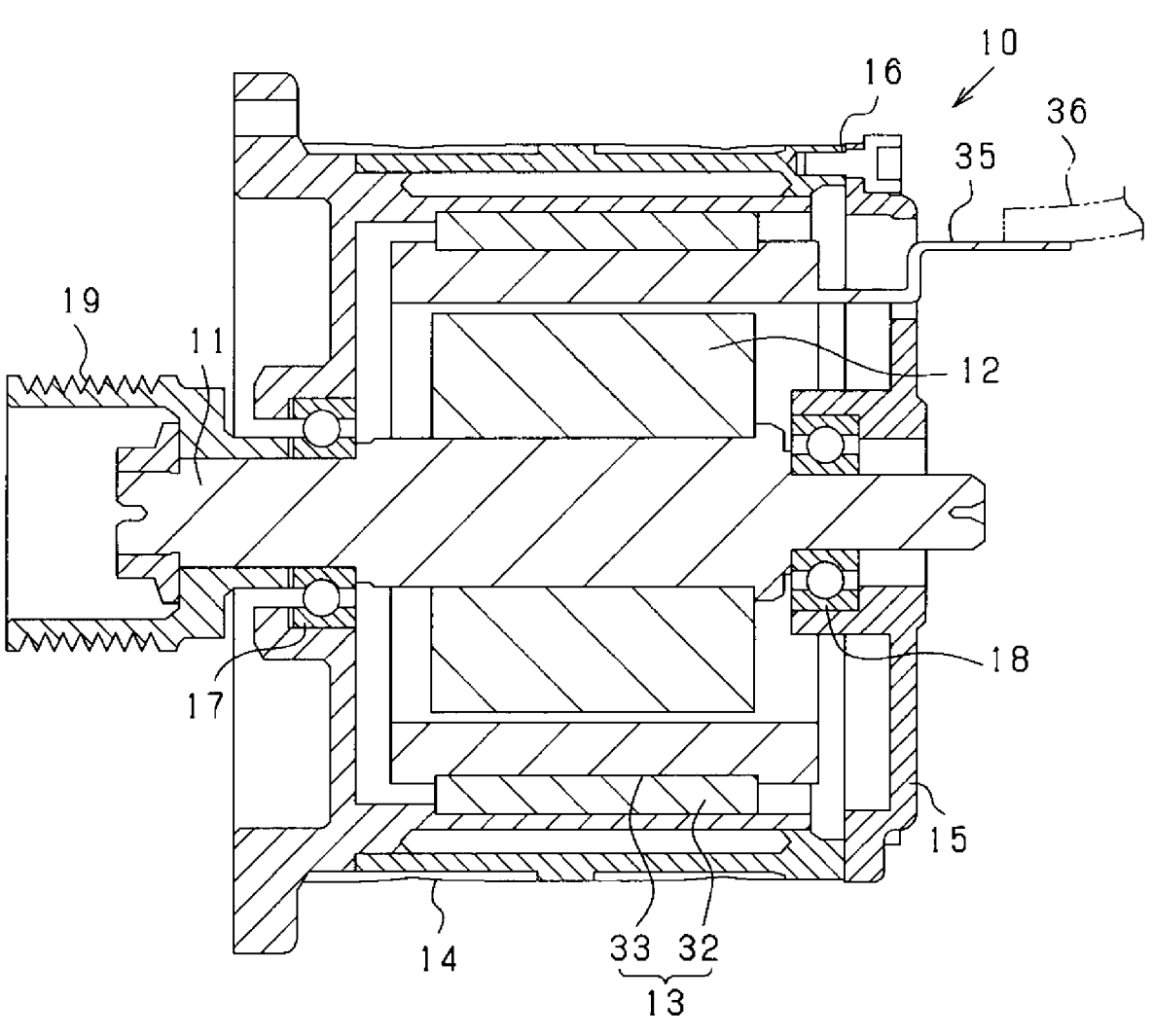
FIG. 1 is a longitudinal cross-sectional view of a rotating electric machine which includes a rotor according to a first embodiment.

The inventors of the present application have found that the above-described IPM rotors known in the art (see, for example, Japanese Patent No. JP6813009B2) may involve the following problem. That is, during operation of the rotating electric machines, thermal stress acts on the rotors and expansion and contraction of the fixing resin repeatedly occur in the magnet-receiving holes. Moreover, vibration and centrifugal force are applied to the rotors. Consequently, peeling and/or breakage of the fixing resin may occur in the magnet-receiving holes, thereby making it impossible to maintain the fixed state of the permanent magnets in the magnet-receiving holes.

The present disclosure has been accomplished in view of the above problem.

With the configuration of the above-described rotor according to the present disclosure, even if peeling and/or breakage of the fixing resin occurs due to thermal stress and/or vibration, the peeling and/or breakage of the fixing resin will occur preferentially on the radially inner side of the permanent magnets in the magnet-receiving holes. As a result, the state of the permanent magnets being fixed (or bonded) by the fixing resin in the magnet-receiving holes is maintained on the radially outer side of the permanent magnets.

Moreover, during operation of the rotating electric machine, centrifugal force of the rotor acts on the permanent magnets. However, with the adhesive strength of the radially outer resin set to be higher than the adhesive strength of the radially inner resin, the fixed state of the permanent magnets is still maintained on the radially outer side of the permanent magnets. As a result, it becomes possible to suitably hold the permanent magnets in the state of being fixed in the magnet-receiving holes of the rotor core.

Furthermore, with the above configuration where the adhesive strength of the radially inner resin is intentionally lowered, it becomes possible to minimize the amount of the fixing resin used in the rotor, more particularly the amount of the fixing resin having a high degree of cure. Consequently, it becomes possible to achieve reduction in the manufacturing cost of the rotor due to the minimization of the amount of use of the fixing resin, reduction in the energy used for curing the fixing resin and thus reduction in the amount of $CO_2$ emitted during the manufacture of the rotor.

In addition, the higher the adhesive strength of the fixing resin, the higher the fixing strength of the permanent magnets to the rotor core. That is, the higher the adhesive strength of the fixing resin, the less likely peeling of the fixing resin is to occur at interfaces between the rotor core and the fixing resin or at interfaces between the permanent magnets and the fixing resin; and the higher the adhesive strength of the fixing resin, the less likely breakage of the fixing resin is to occur between the rotor core and the permanent magnets. Moreover, the higher the tensile strength of the fixing resin, the higher the adhesive strength of the fixing resin.

The fixing resin may be implemented by any suitable resin, for example a thermosetting resin such as an epoxy resin, a polyester resin, an acryl resin, a urethane resin or a phenol resin, or a thermoplastic resin such as a polypropylene resin, a polybutylene terephthalate resin, a polyethylene naphthalate resin, a polyphenylene sulfide resin, a polyetheretherketone resin, a polyimide resin, a polyamide resin or a polyacetal resin. Moreover, a filler, such as glass fiber, carbon fiber or calcium carbonate, may be added to the fixing resin for improving the heat dissipation performance and/or the strength of the fixing resin. In addition, the fixing resin may be provided in the form of two liquids to be mixed together, one liquid, pellet, powder or a foamable adhesive sheet.

The fixing resin may be applied to the radially-outer and radially-inner wall surfaces of the magnet-receiving holes of the rotor core by any suitable method, such as injection molding, potting, insertion of the permanent magnets into the magnet-receiving holes after application of the fixing resin to the permanent magnets, insertion of the permanent magnets into the magnet-receiving holes after application of the fixing resin to the wall surfaces of the magnet-receiving holes, impregnation of the fixing resin into the magnet-receiving holes after insertion of the permanent magnets into the magnet-receiving holes, application of a foamable adhesive or insertion of a foamable adhesive sheet into the magnet-receiving holes. Further, in the case where mixing of components of the fixing resin is required before application of the fixing resin, the mixing may be performed by any suitable means, such as a static mixer, a dynamic mixer or a honeymoon-type adhesive at the bonding surfaces. Moreover, in the case where application of thermal energy or light energy is required for curing the fixing resin, the application of thermal energy or light energy may be performed by any suitable method, such as heating by a furnace, induction heating, energization of a stator coil of the rotating electric machine or electromagnetic waves, or irradiation of a light beam.

In addition, a honeymoon-type adhesive is generally composed of a main component and a curing agent for rapidly curing the main component. The main component and the curing agent are first applied respectively to two bonding surfaces. Then, the two bonding surfaces are placed together to bring the main component and the curing agent into contact with each other, causing the main component to be cured in a short time.

In further implementations of the rotor according to the present disclosure, the radially outer resin and the radially inner resin are different in at least one of material composition and compounding ratio from each other.

With the above configuration, it is possible to suitably realize the difference in adhesive strength between the radially outer resin and the radially inner resin.

The radially outer resin is higher in degree of cure (or reaction rate) than the radially inner resin.

With the above configuration, it is possible to make the adhesive strength of the radially outer resin higher than the adhesive strength of the radially inner resin.

The application area of the radially outer resin on the radially-outer wall surface of the corresponding magnet-receiving hole is greater than the application area of the radially inner resin on the radially-inner wall surface of the corresponding magnet-receiving hole.

With the above configuration, it is also possible to make the adhesive strength of the radially outer resin higher than the adhesive strength of the radially inner resin.

The adhesive strength of the radially inner resin at a first interface is different from the adhesive strength of the radially inner resin at a second interface. The first interface is an interface between the radially-inner wall surface of the corresponding magnet-receiving hole of the rotor core and the radially inner resin, whereas the second interface is an interface between the permanent magnet and the radially inner resin.

As described above, in the rotor according to the present disclosure, the adhesive strength of the radially inner resin is lower than the adhesive strength of the radially outer resin.

Therefore, it is easy for peeling of the radially inner resin to occur. If peeling of the radially inner resin occurs randomly at either the first interface or the second interface, peeled-off resin pieces may be produced in the magnet-receiving holes of the rotor core and intrude into an air gap between the rotor and a stator in the rotating electric machine. In this regard, with the adhesive strength of the radially inner resin at the first interface set to be different from the adhesive strength of the radially inner resin at the second interface, even if peeling of the radially inner resin occurs, the peeling will occur preferentially at one of the first and second interfaces. Consequently, it becomes possible to suppress production of peeled-off resin pieces due to peeling of the radially inner resin.

The rotor is configured to be radially opposed to a stator of the rotating electric machine. The rotor has a plurality of magnetic poles each of which is formed of a corresponding pair of the permanent magnets. For each of the magnetic poles of the rotor, a corresponding pair of the magnet-receiving holes of the rotor core, in which the corresponding pair of the permanent magnets forming the magnetic pole are respectively received, are located respectively on opposite circumferential sides of a center of the magnetic pole and together form a substantially V-shape that opens toward the stator side and spreads from the center of the magnetic pole to both circumferential sides thereof. For each of the permanent magnets, the adhesive strength of a first part of the radially inner resin is set to be higher than the adhesive strength of a second part of the radially inner resin, the first part being located further than the second part from the center of the corresponding magnetic pole.

With the above configuration, even when centrifugal force, which is directed to both the ends of the substantially V-shape formed by each pair of the magnet-receiving holes of the rotor core, acts on the permanent magnets during rotation of the rotor, the fixing resin remains unbroken at locations where the centrifugal force acts on the permanent magnets, i.e., at locations where the fixing resin receives the force in the compression direction. Consequently, it becomes possible to more suitably maintain the fixed state of the permanent magnets in the magnet-receiving holes.

Moreover, with the above-described method according to the present disclosure, in the magnetization step, a force acts on each of the permanent magnets in the direction perpendicular to both the radially-outer and the radially-inner side surfaces of the permanent magnet due to the application of the magnetic field thereto. However, in the curing step prior to the magnetization step, the fixing resin is cured so that the adhesive strength of the radially outer resin is higher than the adhesive strength of the radially inner resin. Consequently, although peeling and/or breakage of the radially inner resin may occur, peeling and/or breakage of the radially outer resin is suppressed. Moreover, during operation of the rotating electric machine, even if peeling and/or breakage of the fixing resin occurs due to thermal stress and/or vibration, the peeling and/or breakage of the fixing resin will occur preferentially on the radially inner side of the permanent magnets in the magnet-receiving holes. As a result, the state of the permanent magnets being fixed (or bonded) by the fixing resin in the magnet-receiving holes is maintained on the radially outer side of the permanent magnets. Furthermore, during operation of the rotating electric machine, centrifugal force of the rotor acts on the permanent magnets. However, with the adhesive strength of the radially outer resin being higher than the adhesive strength of the radially inner resin, the fixed state of the permanent magnets is still maintained on the radially outer side of the permanent magnets. As a result, it becomes possible to suitably hold the permanent magnets in the state of being fixed in the magnet-receiving holes of the rotor core.

In further implementations of the method according to the present disclosure, the fixing resin is formed of a resin material that is curable by thermal energy or light energy. In the curing step, the fixing resin is cured by applying thermal energy or light energy thereto such that the amount of thermal energy or light energy applied to the radially outer resin is greater than the amount of thermal energy or light energy applied to the radially inner resin.

Consequently, it becomes possible to make the degree of cure of the radially outer resin higher than the degree of cure of the radially inner resin. As a result, it becomes possible to make the adhesive strength of the radially outer resin higher than the adhesive strength of the radially inner resin.

In the curing step, the fixing resin is cured by applying thermal energy or light energy to the fixing resin from a radially outer side of the rotor core.

Consequently, it becomes possible to make the amount of thermal energy applied to the radially outer resin greater than the amount of thermal energy applied to the radially inner resin.

The method further includes an arrangement step of arranging, before the curing step, a stator of the rotating electric machine on the radially outer side of the rotor core. The stator includes a stator coil. In the curing step, the fixing resin is cured by thermal energy generated by energization of the stator coil.

Consequently, it becomes possible to suitably cure the fixing resin during the manufacturing process of the rotating electric machine without employing a dedicated heating device for curing.

Exemplary embodiments will be described hereinafter with reference to the drawings.

Rotating electric machines in the following embodiments are configured to be used, for example, as vehicular power sources. However, the rotating electric machines may also be widely used for other applications, such as industrial, marine, aviation, household, office automation and amusement applications.

In addition, in the following embodiments, identical or equivalent parts will be designated by the same reference signs in the drawings; and explanation thereof will not be repeated.

First Embodiment

A rotating electric machine 10, which includes a rotor 12 according to the first embodiment, is configured as an inner rotor type multi-phase AC motor.

Figure 2:
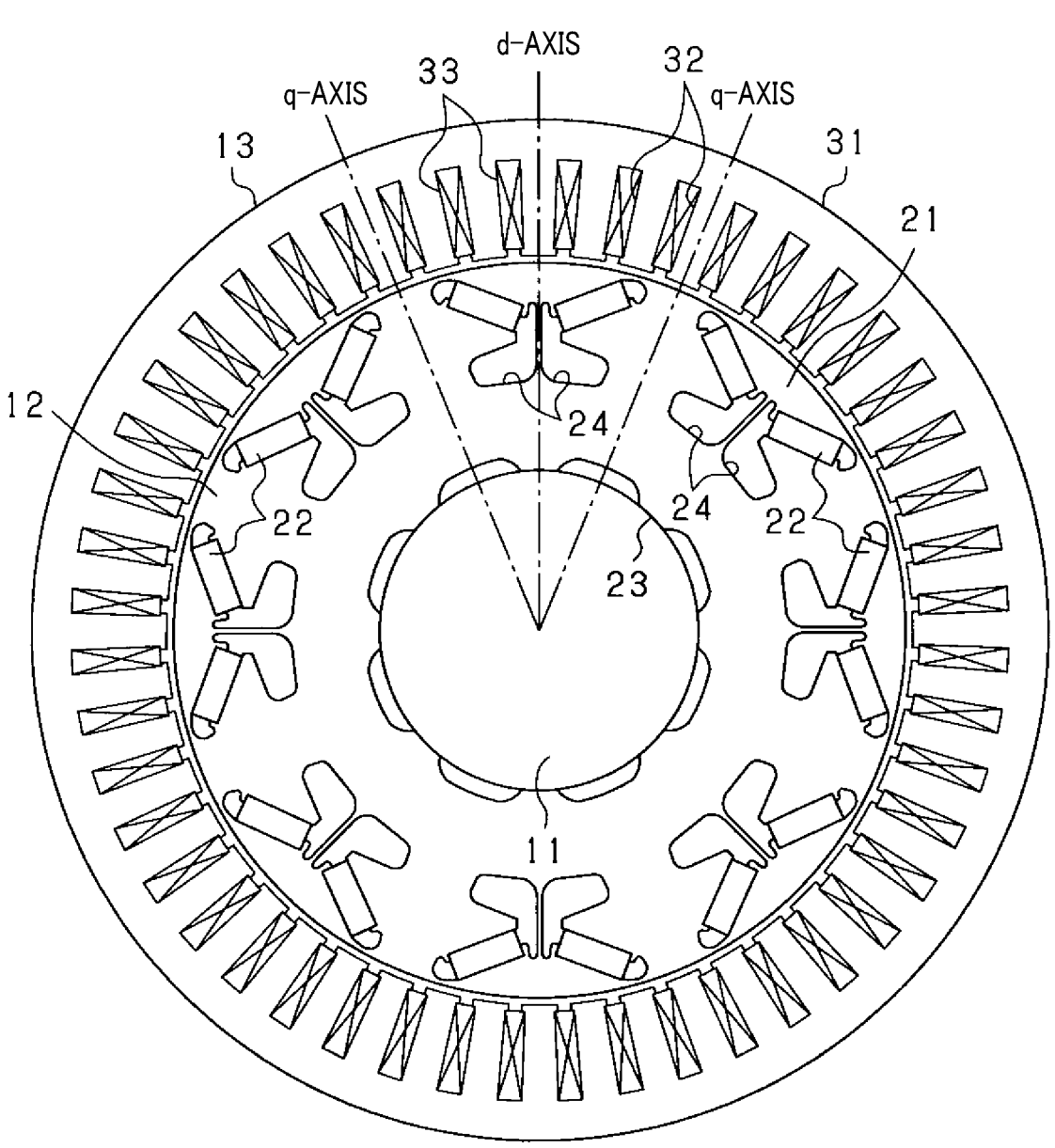
FIG. 2 is a transverse cross-sectional view of both the rotor and a stator of the rotating electric machine.

FIG. 1 is a longitudinal cross-sectional view of the rotating electric machine 10, which is taken along a direction parallel to a rotating shaft 11 of the rotating electric machine 10. FIG. 2 is a transverse cross-sectional view of both the rotor 12 and a stator 13 of the rotating electric machine 10, which is taken along a direction perpendicular to the rotating shaft 11.

Hereinafter, the direction in which the central axis of the rotating shaft 11 extends will be referred to as axial direction; the directions of extending radially from the central axis of the rotating shaft 11 will be referred to as radial directions; and the direction of extending along a circle whose center is on the central axis of the rotating shaft 11 will be referred to as circumferential direction.

As shown in FIGS. 1 and 2, the rotating electric machine 10 includes the rotating shaft 11, the rotor 12 fixed on the rotating shaft 11 so as to rotate together with the rotating shaft 11, the stator 13 arranged to surround the rotor 12, a housing 14 that receives both the rotor 12 and the stator 13 therein, a cover 15 and a pulley 19.

Specifically, the rotor 12 and the stator 13 are arranged coaxially with each other so as to radially face each other. The housing 14 has a bottomed cylindrical shape with an open end on one axial side. The cover 15 is mounted to the housing 14 by fasteners such as bolts 16, so as to cover the open end of the housing 14. A pair of bearings 17 and 18 are provided respectively in the housing 14 and the cover 15. The rotating shaft 11 and the rotor 12 are rotatably supported by the pair of bearings 17 and 18. The pulley 19 is mounted to an axial end portion of the rotating shaft 11 to transmit mechanical power between the rotating shaft 11 and an external device.

In addition, the transmission of mechanical power between the rotating shaft 11 and the external device may alternatively be performed in other manners, such as using splines, gears or a keyed shaft.

As shown in FIG. 2, the rotor 12 is configured as an IPM (Interior Permanent Magnet) rotor. The rotor 12 includes a substantially cylindrical rotor core 21 fixed on the rotating shaft 11, and a plurality of permanent magnets 22 held in the rotor core 21.

The rotor core 21 has a through-hole 23 formed in a radially central part thereof; and the rotating shaft 11 is fitted in the through-hole 23. The rotor core 21 is formed of a magnetic material. More particularly, in the present embodiment, the rotor core 21 is formed by laminating a plurality of magnetic steel sheets in the axial direction and fixing them together by staking or the like. Moreover, in the rotor core 21, there are formed a plurality of magnet-receiving holes 24 at predetermined intervals in the circumferential direction.

Each of the permanent magnets 22 is received in a corresponding one of the magnet-receiving holes 24 of the rotor core 21. Consequently, the permanent magnets 22 are arranged in alignment with each other in the circumferential direction, forming a plurality of magnetic poles of the rotor 12. More particularly, in the present embodiment, the rotor 12 has eight magnetic poles (i.e., four magnetic pole pairs) formed therein; the polarities of the magnetic poles alternate between north and south in the circumferential direction. In other words, the rotor 12 has four N poles and four S poles arranged alternately in the circumferential direction. It should be noted that the number of the magnetic poles of the rotor 12 may be arbitrarily set.

The stator 13 includes a substantially cylindrical (or annular) stator core 31 and a three-phase stator coil 33.

The stator core 31 is formed of a magnetic material. More particularly, in the present embodiment, the stator core 31 is formed by laminating a plurality of magnetic steel sheets in the axial direction and fixing them together by staking or the like. Moreover, in the stator core 31, there are formed a plurality of slots 32 at equal intervals in the circumferential direction; each of the slots 32 axially penetrates the stator core 31.

The stator coil 33 includes three phase windings, for example a U-phase winding, a V-phase winding and a W-phase winding. The phase windings of the stator coil 33 are wound on the stator core 31 so as to be received in the slots 32 of the stator core 31.

Next, the structure of the rotor 12 according to the present embodiment will be described in detail with reference to FIGS. 3A and 3B.

Figure 3A:
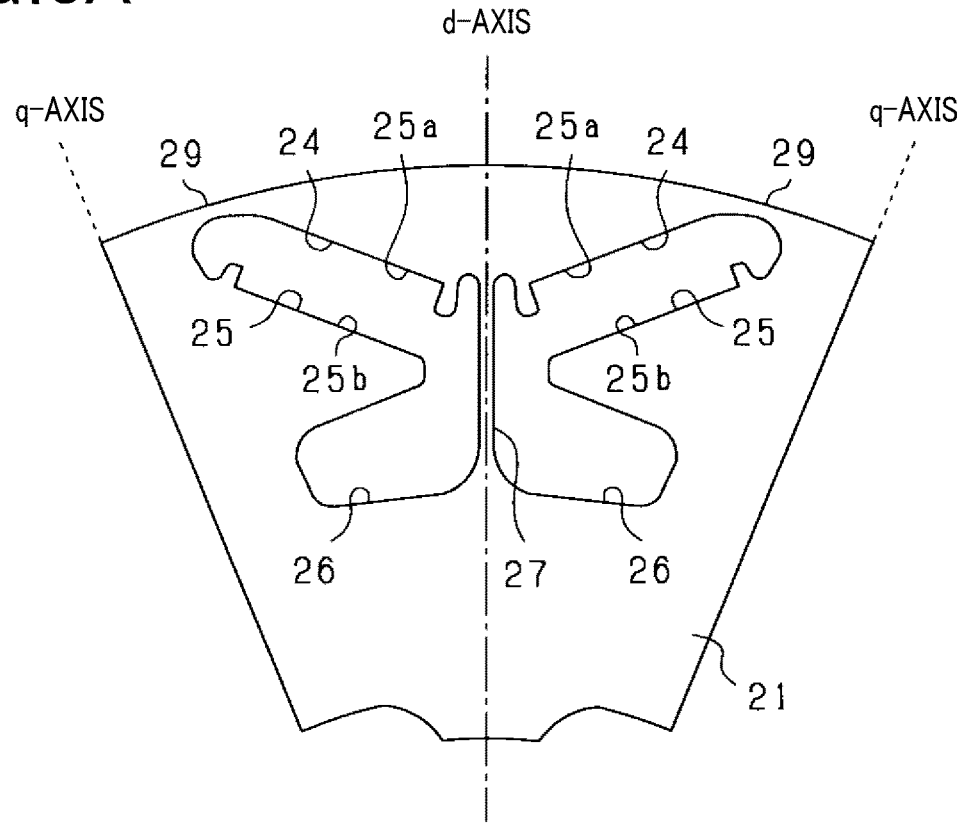
FIG. 3A is a transverse cross-sectional view of part of a rotor core of the rotor.

FIG. 3A shows a pair of magnet-receiving holes 24 of the rotor core 21 in a state of having no permanent magnets 22 received therein. In contrast, FIG. 3B shows a pair of magnet-receiving holes 24 of the rotor core 21 in a state of having the corresponding permanent magnets 22 received therein. It should be noted that FIGS. 3A and 3B show only a part of the rotor core 21 which corresponds to one of the plurality (e.g., eight in the present embodiment) of magnetic poles of the rotor 12. In addition, in FIGS. 3A and 3B, the d-axis represents the centers of the magnetic poles of the rotor 12; and the q-axis represents the boundaries between the magnetic poles of the rotor 12.

As shown in FIG. 3A, in the present embodiment, for each of the magnetic poles of the rotor 12, there is formed a pair of magnet-receiving holes 24 in the rotor core 21. Specifically, the pair of magnet-receiving holes 24 are formed respectively on opposite circumferential sides of the d-axis that represents the center of the magnetic pole, so as to be symmetrical with respect to the d-axis. Moreover, each of the magnet-receiving holes 24 has a first part 25 whose longitudinal direction is oblique to the radial direction, and a second part 26 extending from a d-axis-side end portion of the first part 25 radially inward.

More specifically, for each of the magnet-receiving holes 24, the first part 25 of the magnet-receiving hole 24 is formed to extend obliquely with respect to an imaginary straight line perpendicular to the d-axis. Moreover, the first parts 25 of the pair of magnet-receiving holes 24, which are located respectively on opposite circumferential sides of the d-axis, together form a substantially V-shape such that the radial distance from each of the first parts 25 to the stator 13 (or to the radially-outer peripheral surface of the rotor core 21) decreases in the circumferential direction from the d-axis to the q-axis. In other words, the first parts 25 of the pair of magnet-receiving holes 24 together form a substantially V-shape that opens toward the stator 13 side and spreads from the center of the magnetic pole (i.e., the d-axis) to both circumferential sides thereof. On the other hand, for each of the magnet-receiving holes 24, the second part 26 of the magnet-receiving hole 24 is formed to have both a radially-extending portion that extends from the d-axis-side end portion of the first part 25 radially inward and a circumferentially-extending portion that extends in the circumferential direction from the radially-extending portion toward the q-axis. Moreover, between the second parts 26 of the pair of magnet-receiving holes 24 located respectively on opposite circumferential sides of the d-axis, there is formed in the rotor core 21 a d-axis-side bridge 27 that radially extends along the d-axis.

Figure 3B:
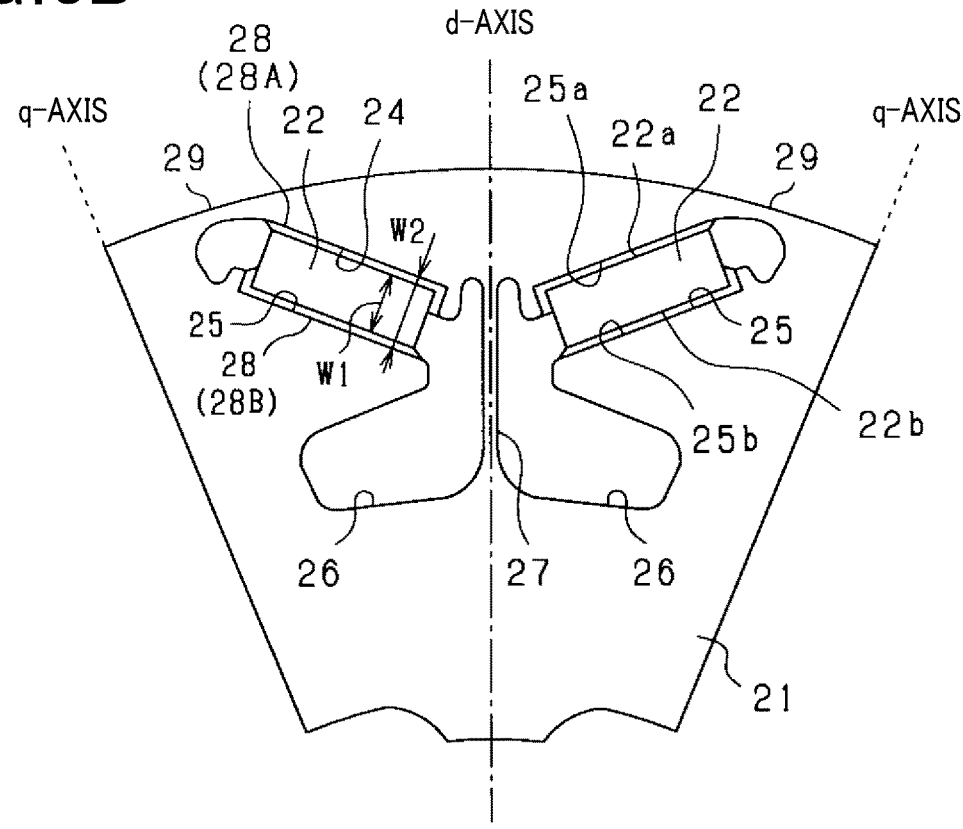
FIG. 3B is a transverse cross-sectional view of part of the rotor.

As shown in FIG. 3B, each of the permanent magnets 22 is received in the first part 25 of the corresponding magnet-receiving hole 24 and fixed therein by a fixing resin 28. Specifically, in the present embodiment, each of the permanent magnets 22 has a rectangular cross section; and two longer sides of the rectangular cross section respectively represent a pair of side surfaces 22a and 22b of the permanent magnet 22 which are radially opposite to each other. That is, each of the permanent magnets 22 has a radially-outer side surface 22a and a radially-inner side surface 22b. The radially-outer and radially-inner side surfaces 22a and 22b of the permanent magnet 22 respectively face a pair of wall surfaces 25a and 25b of the first part 25 of the corresponding magnet-receiving hole 24 which are radially opposite to each other. That is, the first part 25 of the corresponding magnet-receiving hole 24 has a radially-outer wall surface 25a located radially outside the permanent magnet 22 and a radially-inner wall surface 25b located radially inside the permanent magnet 22. Here, the wall surfaces 25a and 25b respectively denote radially-outer and radially-inner interior wall surfaces of the rotor core 21 which define the first part 25 of the corresponding magnet-receiving hole 24. Moreover, the side surfaces 22a and 22b of the permanent magnet 22 are parallel to each other; and the wall surfaces 25a and 25b of the first part 25 of the corresponding magnet-receiving hole 24 are also parallel to each other. In addition, the side surfaces 22a and 22b of the permanent magnet 22 constitute magnetic flux acting surfaces through which magnetic flux flows into or out of the permanent magnet 22.

In a state of each of the permanent magnets 22 having been received in the corresponding magnet-receiving hole 24, a q-axis-side end portion of the first part 25 of the corresponding magnet-receiving hole 24, which is located closer than the permanent magnet 22 to the q-axis, and the entire second part 26 of the corresponding magnet-receiving hole 24 remain empty. In addition, the q-axis-side end portion of the first part 25 is located in close vicinity to the radially-outer peripheral surface of the rotor core 21; and that portion of the rotor core 21 which is located between the q-axis-side end portion of the first part 25 and the radially-outer peripheral surface of the rotor core 21 constitutes a radially outer bridge 29.

In the present embodiment, the following dimensional relationship is satisfied: W1<W2, where W1 is the radial width of each of the permanent magnets 22 (i.e., the distance between the radially-outer and radially-inner side surfaces 22a and 22b of each of the permanent magnets 22), and W2 is the radial width of the first part 25 of the corresponding magnet-receiving hole 24 (i.e., the distance between the radially-outer and radially-inner wall surfaces 25a and 25b of the first part 25 of the corresponding magnet-receiving hole 24). Moreover, each of the permanent magnets 22 is fixed in the first part 25 of the corresponding magnet-receiving hole 24 by the fixing resin 28 interposed between the radially-outer side surface 22a of the permanent magnet 22 and the radially-outer wall surface 25a of the first part 25 and between the radially-inner side surface 22b of the permanent magnet 22 and the radially-inner wall surface 25b of the first part 25.

It should be noted that the arrangement of the magnet-receiving holes 24 of the rotor core 21 and the permanent magnets 22 is not limited to the above-described symmetrical arrangement with respect to the d axis. That is to say, the magnet-receiving holes 24 of the rotor core 21 and the permanent magnets 22 may alternatively be arranged asymmetrically with respect to the d-axis. Moreover, it should also be noted that the cross-sectional shape of the permanent magnets 22 is not limited to the above-described rectangular shape. That is to say, the permanent magnets 22 may alternatively have other cross-sectional shapes, such as an arcuate or curved cross-sectional shape.

In general, in an IPM rotor where permanent magnets are fixed in magnet-receiving holes of a rotor core by a fixing resin, peeling and/or breakage of the fixing resin may occur due to thermal stress and/or vibration generated during operation of the rotating electric machine. Consequently, due to the peeling and/or breakage of the fixing resin, it may become impossible to maintain the fixed state of the permanent magnets in the magnet-receiving holes. In particular, when peeling and/or breakage of the fixing resin occurs on the radially outer side of the permanent magnets due to thermal stress and/or vibration and occurs on the radially inner side of the permanent magnets due to centrifugal force generated during rotation of the rotor, it may become impossible to maintain the fixed state of the permanent magnets in the magnet-receiving holes.

To solve the above problem, in the present embodiment, the adhesive strength of the radially outer resin 28A and the adhesive strength of the radially inner resin 28B are set to be different from each other. Here, the radially outer resin 28A denotes the fixing resin 28 interposed between each of the permanent magnets 22 and the radially-outer wall surface 25a of the first part 25 of the corresponding magnet-receiving hole 24; and the radially inner resin 28B denotes the fixing resin 28 interposed between each of the permanent magnets 22 and the radially-inner wall surface 25b of the first part 25 of the corresponding magnet-receiving hole 24. More particularly, in the present embodiment, the adhesive strength of the radially outer resin 28A is set to be higher than the adhesive strength of the radially inner resin 28B. Consequently, it becomes possible to suitably hold the permanent magnets 22 in the state of being fixed in the magnet-receiving holes 24 of the rotor core 21.

In addition, for each of the permanent magnets 22, the adhesive strength of the radially outer resin 28A denotes the force required to separate the radially outer resin 28A from either the permanent magnet 22 or the radially-outer wall surface 25a of the first part 25 of the corresponding magnet-receiving hole 24 by either shear or tensile stress. Similarly, for each of the permanent magnets 22, the adhesive strength of the radially inner resin 28B denotes the force required to separate the radially inner resin 28B from either the permanent magnets 22 or the radially-inner wall surface 25b of the first part 25 of the corresponding magnet-receiving hole 24 by either shear or tensile stress.

In the present embodiment, the radially outer resin 28A and the radially inner resin 28B are respectively formed of two resin materials that are different in at least one of material composition and compounding ratio from each other. Specifically, the radially outer resin 28A is formed of an epoxy adhesive, whereas the radially inner resin 28B is formed of a cyanoacrylate adhesive. Moreover, the epoxy adhesive forming the radially outer resin 28A is higher in adhesive strength than the cyanoacrylate adhesive forming the radially inner resin 28B. Furthermore, in the present embodiment, the radially outer resin 28A and the radially inner resin 28B are different in degree of cure from each other. In addition, the degree of cure is a parameter indicating the degree of curing of a resin material, and may be measured by, for example, a FT-IR (Fourier Transform-Infrared) spectrophotometer or a DSC (Differential Scanning calorimeter).

As an alternative, both the radially outer resin 28A and the radially inner resin 28B may be formed of an epoxy resin with a filler (e.g., a glass material) added thereto for improving the adhesive strength. In this case, the amount of the filler included in the radially outer resin 28A may be set to be greater than the amount of the filler included in the radially inner resin 28B, thereby making the adhesive strength of the radially outer resin 28A higher than the adhesive strength of the radially inner resin 28B.

As another alternative, both the radially outer resin 28A and the radially inner resin 28B may be formed of an epoxy resin with a curing agent added thereto for promoting the curing reaction. In this case, the amount of the curing agent included in the radially outer resin 28A may be set to be greater than the amount of the curing agent included in the radially inner resin 28B, thereby making the adhesive strength of the radially outer resin 28A higher than the adhesive strength of the radially inner resin 28B.

As described above, in the present embodiment, the adhesive strength of the radially outer resin 28A is set to be higher than the adhesive strength of the radially inner resin 28B. Consequently, even if peeling and/or breakage of the fixing resin 28 occurs due to expansion and contraction thereof, the peeling and/or breakage of the fixing resin 28 will occur preferentially on the radially inner side of the permanent magnets 22 in the magnet-receiving holes 24. As a result, the state of the permanent magnets 22 being fixed (or bonded) by the fixing resin 28 in the magnet-receiving holes 24 is maintained on the radially outer side of the permanent magnets 22.

Figure 4A:
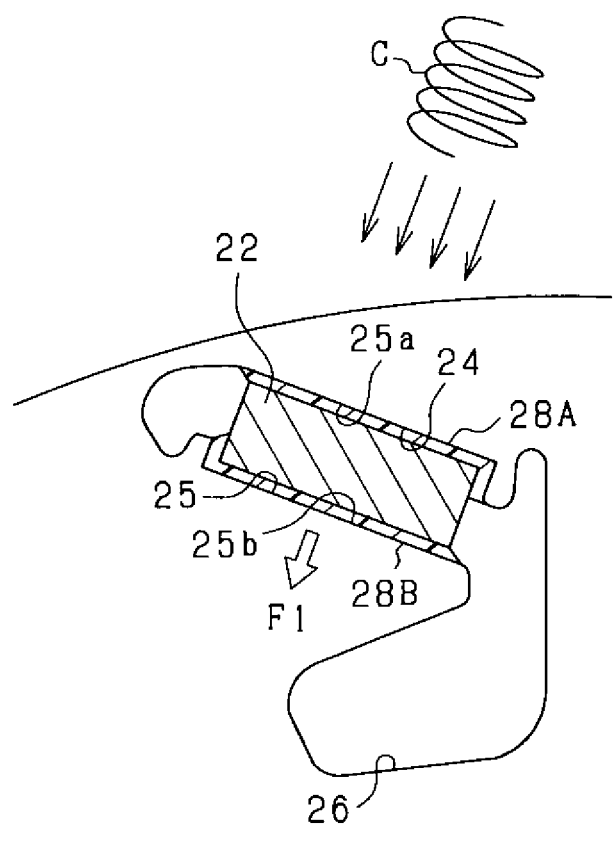
FIG. 4A is an explanatory diagram illustrating a force acting on permanent magnets of the rotor during a magnetization step in manufacturing the rotor.
Figure 4B:
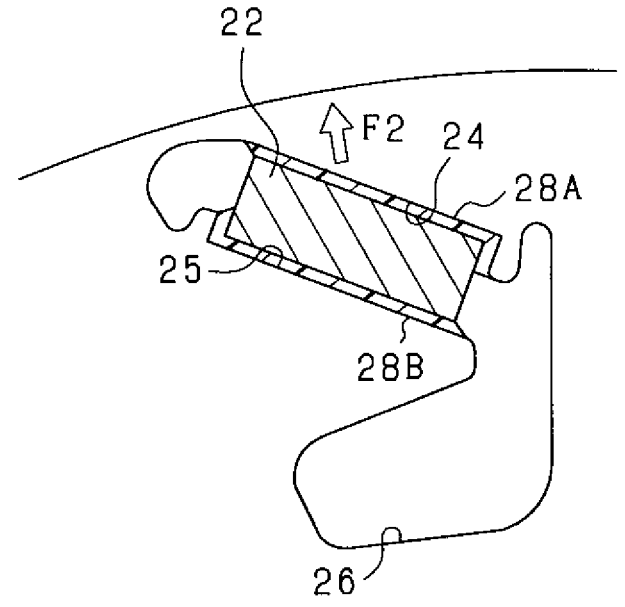
FIG. 4B is an explanatory diagram illustrating a force acting on the permanent magnets of the rotor during operation of the rotating electric machine.

FIG. 4A illustrates a force (electromagnetic force) F1 generated during a magnetization step in manufacturing the rotor 12. FIG. 4B illustrates a force (centrifugal force) F2 generated with rotation of the rotor 12 during operation of the rotating electric machine 10.

As shown in FIG. 4A, in the magnetization step in manufacturing the rotor 12, a magnetic field is applied, by a magnetization coil C arranged radially outside the rotor core 21, to each of the permanent magnets 22 in a direction perpendicular to the longitudinal direction of the permanent magnet 22 (i.e., in a direction perpendicular to both the radially-outer and radially-inner side surfaces 22a and 22b of the permanent magnet 22). For example, in the magnetization of a magnetic pole whose polarity is S, as shown in FIG. 4A, the magnetic field is applied from the radially outer side to the radially inner side of the permanent magnet 22. Consequently, the force F1 acts on the permanent magnet 22 in a direction of pressing the permanent magnet 22 against the radially-inner wall surface 25b of the first part 25 of the corresponding magnet-receiving hole 24. In this case, on the radially outer side of the permanent magnet 22, the force F1 acts on the permanent magnet 22 in a direction of causing peeling of the radially outer resin 28A to occur. However, in the present embodiment, peeling and/or breakage of the radially outer resin 28A is suppressed due to the higher adhesive strength of the radially outer resin 28A.

On the other hand, as shown in FIG. 4B, during operation of the rotating electric machine 10, the force F2 is applied to each of the permanent magnets 22 due to rotation of the rotor 12. In this case, even with generation of the centrifugal force of the rotor 12, the fixed state of each of the permanent magnets 22 is maintained on the radially outer side thereof due to the higher adhesive strength of the radially outer resin 28A. Moreover, during operation of the rotating electric machine 10, peeling and/or breakage of the fixing resin 28 may occur due to thermal stress and/or vibration. However, in the present embodiment, peeling and/or breakage of the radially outer resin 28A is suppressed due to the higher adhesive strength of the radially outer resin 28A. Consequently, the permanent magnets 22 are held in the state of being fixed in the magnet-receiving holes 24.

Next, a method of manufacturing the rotor 12 according to the present embodiment will be described with reference to FIG. 5.

Figure 5:
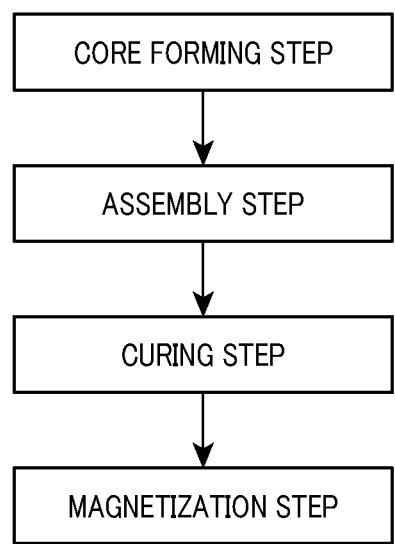
FIG. 5 is a flowchart illustrating steps of a method of manufacturing the rotor according to the first embodiment.

As shown in FIG. 5, the method of manufacturing the rotor 12 according to the present embodiment includes a core forming step, an assembly step, a curing step and a magnetization step.

In the core forming step, the rotor core 21 is formed by laminating a plurality of magnetic steel sheets in the axial direction and fixing them together by staking or the like.

In the assembly step, the permanent magnets 22 in a state of having not been magnetized and the fixing resin 28 in a state of having not been cured are assembled into the magnet-receiving holes 24 of the rotor core 21. Consequently, each of the permanent magnets 22 is received in the corresponding magnet-receiving hole 24 with the fixing resin 28 applied on the radially-outer and radially-inner wall surfaces 25a and 25b of the first part 25 of the corresponding magnet-receiving hole 24.

More specifically, in the assembly step, the permanent magnets 22 may be assembled into the magnet-receiving holes 24 of the rotor core 21 after application of the fixing resin 28 to the radially-outer and radially-inner wall surfaces 25a and 25b of the magnet-receiving holes 24. As an alternative, the permanent magnets 22 may be first assembled into the magnet-receiving holes 24 and then the fixing resin 28 may be applied into the magnet-receiving holes 24. As another alternative, the fixing resin 28 may be first applied to one of the radially-outer and radially-inner wall surfaces 25a and 25b of each of the magnet-receiving holes 24; then the permanent magnets 22 may be assembled into the magnet-receiving holes 24; and thereafter the fixing resin 28 may be further applied to the other of the radially-outer and radially-inner wall surfaces 25a and 25b of each of the magnet-receiving holes 24.

In addition, as described above, in the present embodiment, the radially outer resin 28A (i.e., the fixing resin 28 on the radially outer side of the permanent magnets 22 in the magnet-receiving holes 24) and the radially inner resin 28B (i.e., the fixing resin 28 on the radially inner side of the permanent magnets 22 in the magnet-receiving holes 24) are respectively formed of two resin materials that are different in at least one of material composition and compounding ratio from each other.

In the curing step, the fixing resin 28 in the magnet-receiving holes 24 is cured so that the adhesive strength of the radially outer resin 28A is higher than the adhesive strength of the radially inner resin 28B.

In the case of both the radially outer resin 28A and the radially inner resin 28B being formed of a thermosetting resin, the radially outer resin 28A and the radially inner resin 28B may be cured by applying thermal energy thereto. Moreover, the radially outer resin 28A may be cured faster than the radially inner resin 28B, thereby making the degree of cure of the radially outer resin 28A higher than the degree of cure of the radially inner resin 28B.

Furthermore, in the above case, the amount of thermal energy applied to the radially outer resin 28A in the curing step may be set to be greater than the amount of thermal energy applied to the radially inner resin 28B in the curing step, thereby making the adhesive strength of the radially outer resin 28A higher than the adhesive strength of the radially inner resin 28B. More specifically, in the curing step, thermal energy may be applied from the radially outer side of the rotor core 21, thereby making the amount of thermal energy applied to the radially outer resin 28A greater than the amount of thermal energy applied to the radially inner resin 28B. As a result, the degree of cure of the radially outer resin 28A will become higher than the degree of cure of the radially inner resin 28B.

In the magnetization step after the curing step, each of the permanent magnets 22 is magnetized by applying a magnetic field to the permanent magnet 22 in a direction perpendicular to both the radially-outer and radially-inner side surfaces 22a and 22b of the permanent magnet 22 that respectively face the radially-outer and radially-inner wall surfaces 25a and 25b of the corresponding magnet-receiving hole 24.

Specifically, in this step, the permanent magnets 22 are magnetized by an external magnetic field generated by a magnetization device that is arranged radially outside the rotor core 21. Consequently, magnetization is performed, on a per magnetic pole basis, for the permanent magnets 22 received in the magnet-receiving holes 24 of the rotor core 21.

According to the present embodiment described in detail above, it is possible to achieve the following advantageous effects.

In the present embodiment, the rotor 12 of the rotating electric machine 10 includes the rotor core 21 and the permanent magnets 22. The rotor core 21 has the magnet-receiving holes 24 formed along the circumferential direction. Each of the permanent magnets 22 is received in a corresponding one of the magnet-receiving holes 24 of the rotor core 21. Moreover, each of the magnet-receiving holes 24 has the radially-outer wall surface 25a and the radially-inner wall surface 25b that are radially opposite to each other. Each of the permanent magnets 22 is fixed in the corresponding magnet-receiving hole 24 of the rotor core 21 by the fixing resin 28 that includes the radially outer resin 28A interposed between the permanent magnet 22 and the radially-outer wall surface 25a of the corresponding magnet-receiving hole 24 and the radially inner resin 28B interposed between the permanent magnet 22 and the radially-inner wall surface 25b of the corresponding magnet-receiving hole 24. Furthermore, the adhesive strength of the radially outer resin 28A between the permanent magnet 22 and the radially-outer wall surface 25a of the corresponding magnet-receiving hole 24 is set to be higher than the adhesive strength of the radially inner resin 28B between the permanent magnet 22 and the radially-inner wall surface 25b of the corresponding magnet-receiving hole 24.

With the above configuration, even if peeling and/or breakage of the fixing resin 28 occurs due to thermal stress and/or vibration, the peeling and/or breakage of the fixing resin 28 will occur preferentially on the radially inner side of the permanent magnets 22 in the magnet-receiving holes 24. As a result, the state of the permanent magnets 22 being fixed (or bonded) by the fixing resin 28 in the magnet-receiving holes 24 is maintained on the radially outer side of the permanent magnets 22.

Moreover, during operation of the rotating electric machine 10, centrifugal force of the rotor 12 acts on the permanent magnets 22. However, with the adhesive strength of the radially outer resin 28A set to be higher than the adhesive strength of the radially inner resin 28B, the fixed state of the permanent magnets 22 is still maintained on the radially outer side of the permanent magnets 22. As a result, it becomes possible to suitably hold the permanent magnets 22 in the state of being fixed in the magnet-receiving holes 24 of the rotor core 21.

Furthermore, with the above configuration where the adhesive strength of the radially inner resin 28B is intentionally lowered, it becomes possible to minimize the amount of the fixing resin 28 used in the rotor 12, more particularly the amount of the fixing resin 28 having a high degree of cure. Consequently, it becomes possible to achieve reduction in the manufacturing cost of the rotor 12 due to the minimization of the amount of use of the fixing resin 28, reduction in the energy used for curing the fixing resin 28 and thus reduction in the amount of $CO_2$ emitted during the manufacture of the rotor 12.

In the present embodiment, the radially outer resin 28A and the radially inner resin 28B are different in at least one of material composition and compounding ratio from each other.

With the above configuration, it is possible to suitably realize the difference in adhesive strength between the radially outer resin 28A and the radially inner resin 28B.

In the present embodiment, the degree of cure of the radially outer resin 28A is higher than the degree of cure of the radially inner resin 28B.

With the above configuration, it is possible to make the adhesive strength of the radially outer resin 28A higher than the adhesive strength of the radially inner resin 28B.

In the present embodiment, the method of manufacturing the rotor 12 includes the core forming step, the assembly step, the curing step and the magnetization step. In the core forming step, the rotor core 21 is formed by laminating a plurality of magnetic steel sheets in the axial direction and fixing them together by staking or the like. In the assembly step, the permanent magnets 22 in a state of having not been magnetized and the fixing resin 28 in a state of having not been cured are assembled into the magnet-receiving holes 24 of the rotor core 21 so that each of the permanent magnets 22 is received in the corresponding magnet-receiving hole 24 with the fixing resin 28 applied on the radially-outer and radially-inner wall surfaces 25a and 25b of the corresponding magnet-receiving hole 24. In the curing step, the fixing resin 28 in the magnet-receiving holes 24 of the rotor core 21 is cured so that each of the permanent magnets 22 is fixed in the corresponding magnet-receiving hole 24 by the fixing resin 28 that includes the radially outer resin 28A interposed between the permanent magnet 22 and the radially-outer wall surface 25a of the corresponding magnet-receiving hole 24 and the radially inner resin 28B interposed between the permanent magnet 22 and the radially-inner wall surface 25b of the corresponding magnet-receiving hole 24. In the magnetization step after the curing step, each of the permanent magnets 22 is magnetized by applying a magnetic field to the permanent magnet 22 in a direction perpendicular to both the radially-outer and the radially-inner side surfaces 22a and 22b of the permanent magnet 22 that respectively face the radially-outer and radially-inner wall surfaces 25a and 25b of the corresponding magnet-receiving hole 24. Furthermore, in the present embodiment, in the curing step, the fixing resin 28 is cured so that the adhesive strength of the radially outer resin 28A between each of the permanent magnets 22 and the radially-outer wall surface 25a of the corresponding magnet-receiving hole 24 is higher than the adhesive strength of the radially inner resin 28B between each of the permanent magnets 22 and the radially-inner wall surface 25b of the corresponding magnet-receiving hole 24.

With the above method, in the magnetization step, a force acts on each of the permanent magnets 22 in the direction perpendicular to both the radially-outer and the radially-inner side surfaces 22a and 22b of the permanent magnet 22 due to the application of the magnetic field thereto. However, in the curing step prior to the magnetization step, the fixing resin 28 is cured so that the adhesive strength of the radially outer resin 28A is higher than the adhesive strength of the radially inner resin 28B. Consequently, although peeling and/or breakage of the radially inner resin 28B may occur, peeling and/or breakage of the radially outer resin 28A is suppressed. Moreover, during operation of the rotating electric machine 10, even if peeling and/or breakage of the fixing resin 28 occurs due to thermal stress and/or vibration, the peeling and/or breakage of the fixing resin 28 will occur preferentially on the radially inner side of the permanent magnets 22 in the magnet-receiving holes 24. As a result, the state of the permanent magnets 22 being fixed (or bonded) by the fixing resin 28 in the magnet-receiving holes 24 is maintained on the radially outer side of the permanent magnets 22. Furthermore, during operation of the rotating electric machine 10, centrifugal force of the rotor 12 acts on the permanent magnets 22. However, with the adhesive strength of the radially outer resin 28A being higher than the adhesive strength of the radially inner resin 28B, the fixed state of the permanent magnets 22 is still maintained on the radially outer side of the permanent magnets 22. As a result, it becomes possible to suitably hold the permanent magnets 22 in the state of being fixed in the magnet-receiving holes 24 of the rotor core 21.

In the present embodiment, in the curing step, the fixing resin 28 is cured by applying thermal energy thereto such that the amount of thermal energy applied to the radially outer resin 28A is greater than the amount of thermal energy applied to the radially inner resin 28B. Consequently, it becomes possible to make the degree of cure of the radially outer resin 28A higher than the degree of cure of the radially inner resin 28B. As a result, it becomes possible to make the adhesive strength of the radially outer resin 28A higher than the adhesive strength of the radially inner resin 28B.

Moreover, in the present embodiment, in the curing step, the fixing resin 28 is cured by applying thermal energy to the fixing resin 28 from the radially outer side of the rotor core 21. Consequently, it becomes possible to make the amount of thermal energy applied to the radially outer resin 28A greater than the amount of thermal energy applied to the radially inner resin 28B.

Modification of First Embodiment

Figure 6:
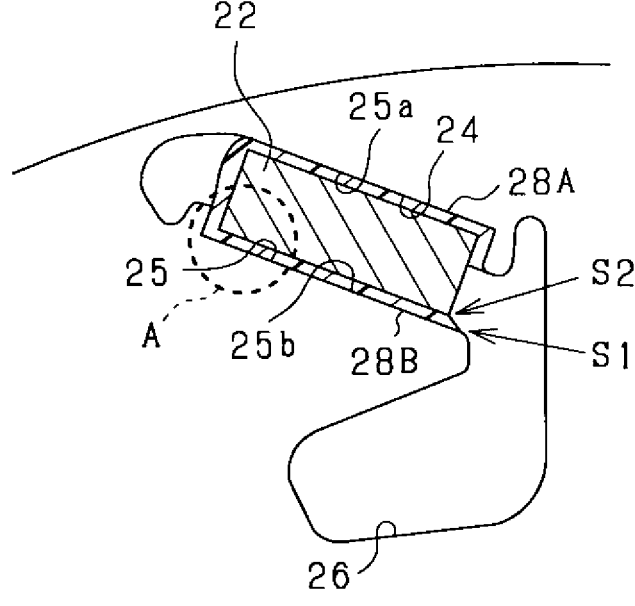
FIG. 6 is a transverse cross-sectional view of part of a rotor according to a modification of the first embodiment.

FIG. 6 shows of part of a rotor 12 according to a modification of the first embodiment.

In this modification, as described in the previous embodiment, each of the permanent magnets 22 is fixed in the corresponding magnet-receiving hole 24 of the rotor core 21 with the radially outer resin 28A interposed between the permanent magnet 22 and the radially-outer wall surface 25a of the corresponding magnet-receiving hole 24 and the radially inner resin 28B interposed between the permanent magnet 22 and the radially-inner wall surface 25b of the corresponding magnet-receiving hole 24. In addition, the adhesive strength of the radially outer resin 28A is set to be higher than the adhesive strength of the radially inner resin 28B.

Moreover, in this modification, the adhesive strength of a first part of the radially inner resin 28B is set to be higher than the adhesive strength of a second part of the radially inner resin 28B; the first part is located further than the second part from the center of the corresponding magnetic pole of the rotor 12 (or from the d-axis). In the example shown in FIG. 6, that part of the radially inner resin 28B which is enclosed with a dashed line A corresponds to the first part of the radially inner resin 28B; and the remainder of the radially inner resin 28B corresponds to the second part of the radially inner resin 28B. In addition, the first part of the radially inner resin 28B may be formed of the resin material of the radially outer resin 28A which has flowed from the radially-outer wall surface 25a to the radially-inner wall surface 25b of the corresponding magnet-receiving hole 24.

With the above configuration, even when centrifugal force, which is directed to both the ends of the substantially V-shape formed by each pair of the magnet-receiving holes 24 of the rotor core 21, acts on the permanent magnets 22 during rotation of the rotor 12, the fixing resin 28 remains unbroken at locations where the centrifugal force acts on the permanent magnets 22, i.e., at locations where the fixing resin 28 receives the force in the compression direction. Consequently, it becomes possible to more suitably maintain the fixed state of the permanent magnets 22 in the magnet-receiving holes 24.

Furthermore, in this modification, for each of the permanent magnets 22, the adhesive strength of the radially inner resin 28B at a first interface S1 is set to be different from the adhesive strength of the radially inner resin 28B at a second interface S2. As shown in FIG. 6, the first interface S1 is an interface between the radially-inner wall surface 25b of the corresponding magnet-receiving hole 24 of the rotor core 21 and the radially inner resin 28B, whereas the second interface S2 is an interface between the permanent magnet 22 and the radially inner resin 28B.

As described above, the adhesive strength of the radially outer resin 28A is set to be higher than the adhesive strength of the radially inner resin 28B. In other words, the adhesive strength of the radially inner resin 28B is set to be lower than the adhesive strength of the radially outer resin 28A. Therefore, it is easy for peeling of the radially inner resin 28B to occur. If peeling of the radially inner resin 28B occurs randomly at either the first interface S1 or the second interface S2, peeled-off resin pieces may be produced in the magnet-receiving holes 24 of the rotor core 21 and intrude into an air gap between the rotor 12 and the stator 13 in the rotating electric machine 10. In this regard, with the adhesive strength of the radially inner resin 28B at the first interface S1 set to be different from the adhesive strength of the radially inner resin 28B at the second interface S2, even if peeling of the radially inner resin 28B occurs, the peeling will occur preferentially at one of the first and second interfaces S1 and S2. Consequently, it becomes possible to suppress production of peeled-off resin pieces due to peeling of the radially inner resin 28B.

Second Embodiment

A rotor 12 according to the second embodiment has a similar structure to the rotor 12 according to the first embodiment. Therefore, the differences of the rotor 12 according to the second embodiment from the rotor 12 according to the first embodiment will be mainly described hereinafter.

Figure 7:
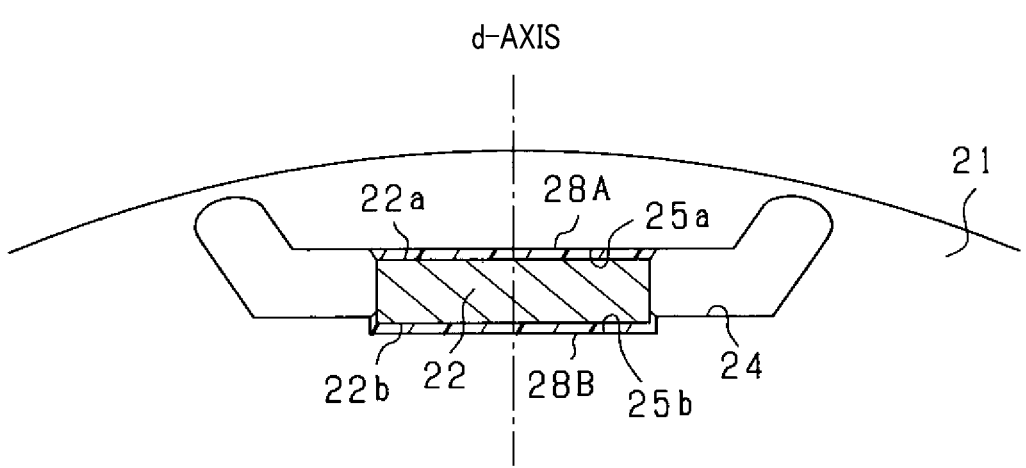
FIG. 7 is a transverse cross-sectional view of part of a rotor according to a second embodiment.

FIG. 7 is a transverse cross-sectional view of part of the rotor 12 according to the second embodiment.

As shown in FIG. 7, in the present embodiment, for each of the magnetic poles of the rotor 12, there is formed a single magnet-receiving hole 24 in the rotor core 21. Specifically, the magnet-receiving hole 24 is formed to extend in a direction perpendicular to the d-axis that represents the center of the magnetic pole. Moreover, the magnet-receiving hole 24 is formed symmetrically with respect to the d-axis. In addition, the magnet-receiving hole 24 has a pair of radially-outer and radially-inner wall surfaces 25a and 25b that are radially opposite to each other and both extend perpendicular to the d-axis.

Furthermore, in the magnet-receiving hole 24, there is received a corresponding one of the permanent magnets 22; the corresponding permanent magnet 22 forms the magnetic pole of the rotor 12. In addition, both q-axis-side parts of the magnet-receiving hole 24, which are located respectively on opposite circumferential sides of the corresponding permanent magnet 22, remain empty.

In the present embodiment, each of the permanent magnets 22 has a pair of radially-outer and radially-inner side surfaces 22a and 22b that are radially opposite to each other and both extend perpendicular to the d-axis. Moreover, as in the first embodiment, each of the permanent magnets 22 is fixed in a corresponding one of the magnet-receiving holes 24 of the rotor core 21 by a fixing resin 28. The fixing resin 28 includes a radially outer resin 28A interposed between the radially-outer side surface 22a of the permanent magnet 22 and the radially-outer wall surface 25a of the corresponding magnet-receiving hole 24 and a radially inner resin 28B interposed between the radially-inner side surface 22b of the permanent magnet 22 and the radially-inner wall surface 25b of the corresponding magnet-receiving hole 24. Furthermore, as in the first embodiment, the adhesive strength of the radially outer resin 28A is set to be higher than the adhesive strength of the radially inner resin 28B. In addition, the radially outer resin 28A and the radially inner resin 28B are configured as described in the first embodiment.

As described above, in the present embodiment, the adhesive strength of the radially outer resin 28A is set to be higher than the adhesive strength of the radially inner resin 28B. Consequently, even if peeling and/or breakage of the fixing resin 28 occurs due to expansion and contraction thereof, the peeling and/or breakage of the fixing resin 28 will occur preferentially on the radially inner side of the permanent magnets 22 in the magnet-receiving holes 24. As a result, the state of the permanent magnets 22 being fixed (or bonded) by the fixing resin 28 in the magnet-receiving holes 24 is maintained on the radially outer side of the permanent magnets 22.

Figure 8:
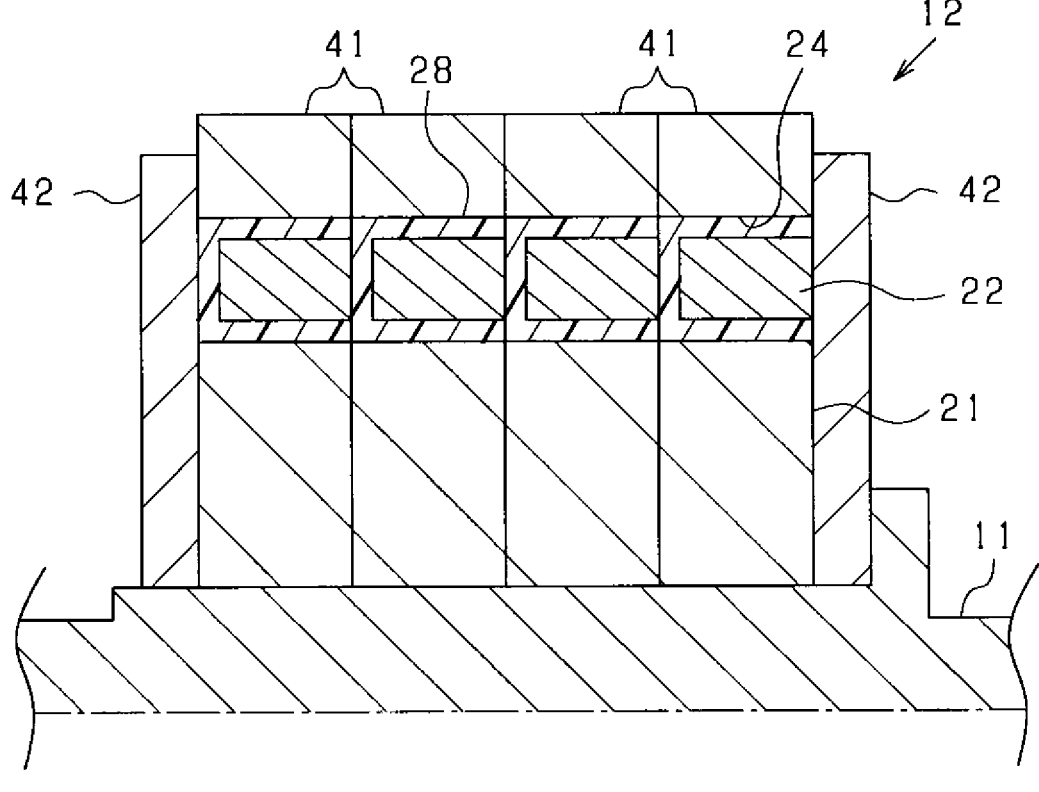
FIG. 8 is a longitudinal cross-sectional view illustrating the configuration of the rotor according to the second embodiment.

FIG. 8 is a longitudinal cross-sectional view illustrating the configuration of the rotor 12 according to the present embodiment. It should be noted that the left-right direction in FIG. 8 coincides with the axial direction.

As shown in FIG. 8, in the present embodiment, the rotor core 21 is composed of a plurality (e.g., four) of core segments 41 that are stacked in the axial direction. Each of the core segments 41 is formed by laminating a plurality of magnetic steel sheets in the axial direction. The core segments 41 are fixed on the rotating shaft 11. Moreover, in the present embodiment, the rotor 12 further has a pair of end plates 42 arranged respectively on opposite axial sides of the core segments 41 to restrict axial movement of the core segments 41.

In each of the core segments 41, there are formed a plurality of magnet-receiving holes 24. The core segments 41 are stacked together so that the magnet-receiving holes 24 of each of the core segments 41 are axially aligned respectively with the magnet-receiving holes 24 of any of the other core segments 41. That is, the magnet-receiving holes 24 of each of the core segments 41 are located respectively at the same circumferential positions as the magnet-receiving holes 24 of any of the other core segments 41. It should be noted that the magnet-receiving holes 24 of each of the core segments 41 may alternatively be offset in the circumferential direction respectively from the magnet-receiving holes 24 of any of the other core segments 41.

In each of the magnet-receiving holes 24 of the core segments 41, there is received a permanent magnet 22. Specifically, the permanent magnet 22 is fixed in the magnet-receiving receiving hole 24 by the fixing resin 28 that includes the radially outer resin 28A interposed between the permanent magnet 22 and the radially-outer wall surface 25a of the magnet-receiving hole 24 and the radially inner resin 28B interposed between the permanent magnet 22 and the radially-inner wall surface 25b of the magnet-receiving hole 24.

Moreover, for each axially-adjacent pair of the core segments 41, the permanent magnets 22 received in the magnet-receiving holes 24 of one of the pair of the core segments 41 are axially spaced from the permanent magnets 22 received in the magnet-receiving holes 24 of the other of the pair of the core segments 41. The fixing resin 28 is also provided between the permanent magnets 22 axially spaced from each other.

According to the present embodiment, it is also possible to achieve the same advantageous effects as described in the first embodiment. In particular, with the adhesive strength of the radially outer resin 28A set to be higher than the adhesive strength of the radially inner resin 28B, it is possible to suitably hold the permanent magnets 22 in the state of being fixed in the magnet-receiving holes 24.

In addition, it should be noted that the axially-segmented rotor structure according to the present embodiment can also be applied to the rotor 12 according to the first embodiment.

While the above particular embodiments have been shown and described, it will be understood by those skilled in the art that various modifications, changes and improvements may be made without departing from the spirit of the present disclosure.

(1) The following methods may alternatively be used to set the adhesive strength of the radially outer resin 28A to be higher than the adhesive strength of the radially inner resin 28B.

Each of the radially outer resin 28A and the radially inner resin 28B may be configured to include air bubbles. Further, the amount of air bubbles included in the radially inner resin 28B may be set to be greater than the amount of air bubbles included in the radially outer resin 28A, thereby making the strength of the radially inner resin 28B lower than the strength of the radially outer resin 28A. Consequently, the adhesive strength of the radially outer resin 28A will become higher than the adhesive strength of the radially inner resin 28B.

For each of the permanent magnets 22, the surface roughness of the radially-outer side surface 22a of the permanent magnet 22 may be set to be greater than the surface roughness of the radially-inner side surface 22b of the permanent magnet 22, thereby making the adhesive strength of the radially outer resin 28A higher than the adhesive strength of the radially inner resin 28B.

The thickness of the radially outer resin 28A may be set to be different from the thickness of the radially inner resin 28B, thereby making the adhesive strength of the radially outer resin 28A higher than the adhesive strength of the radially inner resin 28B.

For each of the permanent magnets 22, a surface treatment may be performed on the radially-outer side surface 22a of the permanent magnet 22, thereby making the adhesive strength of the radially outer resin 28A higher than the adhesive strength of the radially inner resin 28B.

For each of the permanent magnets 22, the application area of the radially outer resin 28A on the radially-outer wall surface 25a of the corresponding magnet-receiving hole 24 may be set to be greater than the application area of the radially inner resin 28B on the radially-inner wall surface 25b of the corresponding magnet-receiving hole 24, thereby making the adhesive strength of the radially outer resin 28A higher than the adhesive strength of the radially inner resin 28B.

(2) In manufacturing the rotor 12, the fixing resin 28 may be cured by thermal energy generated by energization of the stator coil 33.

Specifically, before the curing step, the stator 13 may be arranged on the radially outer side of the rotor core 21. Then, in the curing step, the stator coil 33 is energized (i.e., supplied with electric power) so that the fixing resin 28 is cured by thermal energy generated by the energization of the stator coil 33 on the radially outer side of the rotor core 21.

With the above method, it is possible to suitably cure the fixing resin 28 during the manufacturing process of the rotating electric machine 10 without employing a dedicated heating device for curing.

(3) In the first embodiment, in the assembly step, the permanent magnets 22 in a state of having not been magnetized are assembled into the magnet-receiving holes 24 of the rotor core 21.

Alternatively, in the assembly step, the permanent magnets 22 in a state of having been magnetized may be assembled into the magnet-receiving holes 24 of the rotor core 21.

(4) In the first embodiment, the fixing resin 28 is formed of a thermosetting resin, i.e., formed of a resin material that is curable by thermal energy.

Alternatively, the fixing resin 28 may be formed of a resin material that is curable by light energy. In this case, the fixing resin 28 may be cured by applying light energy thereto such that the amount of light energy applied to the radially outer resin 28A is greater than the amount of light energy applied to the radially inner resin 28B. Furthermore, the fixing resin 28 may be cured by applying light energy to the fixing resin 28 from the radially outer side of the rotor core 21.

(5) The configurations of the magnet-receiving holes 24 of the rotor core 21 and the permanent magnets 22 described in the above embodiments may be modified as follows.

Figure 9A:
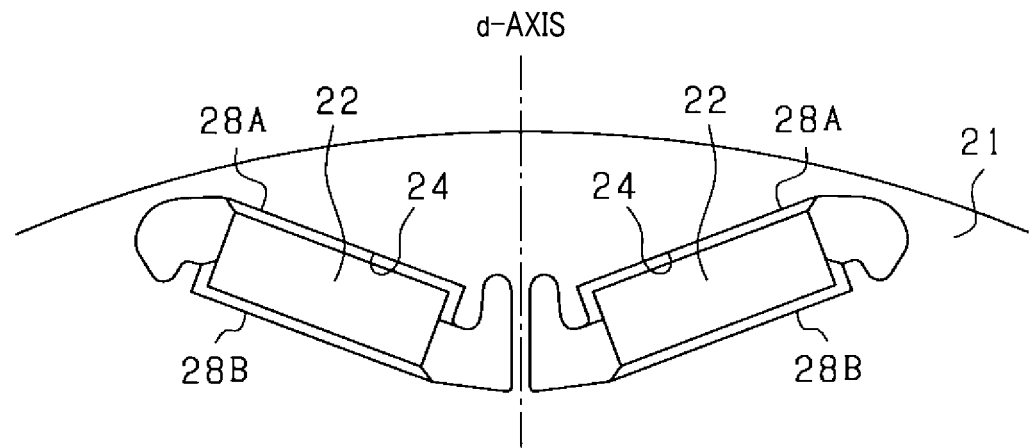
FIGS. 9A-9B and 10A-10C are diagrams illustrating the configurations of rotors according to modifications of the first and second embodiments.

As shown in FIG. 9A, each of the magnet-receiving holes 24 may alternatively be configured to have no second part 26 (see FIG. 3B).

Figure 9B:
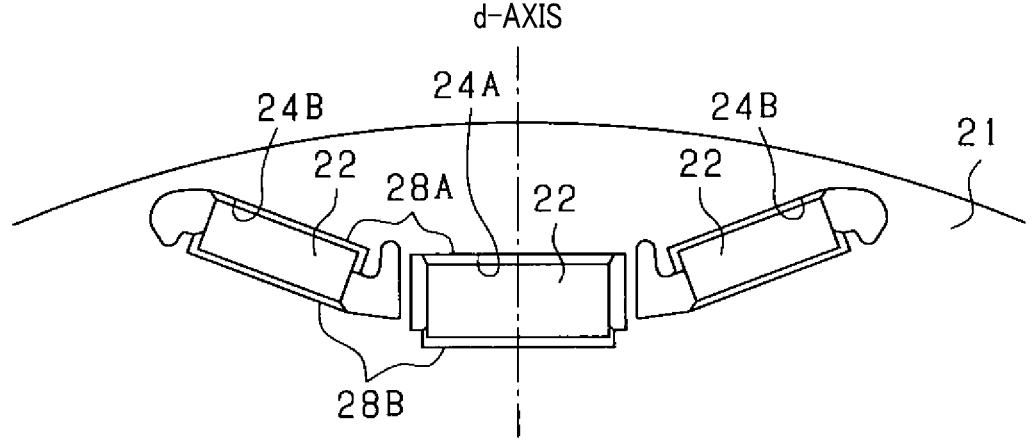

As shown in FIG. 9B, for each of the magnetic poles of the rotor 12, there may be formed a first magnet-receiving hole 24A and a pair of second magnet-receiving holes 24B in the rotor core 21. The first magnet-receiving hole 24A is formed to extend in a direction perpendicular to the d-axis that represents the center of the magnetic pole. Moreover, the first magnet-receiving hole 24A is formed symmetrically with respect to the d-axis. On the other hand, the second magnet-receiving holes 24B are formed, respectively on opposite circumferential sides of the first magnet-receiving hole 24A, to extend obliquely with respect to the direction perpendicular to the d-axis. Moreover, the second magnet-receiving holes 24B are also formed symmetrically with respect to the d-axis.

In the rotor core 21, the magnet-receiving holes 24 may be formed in a plurality of layers in the radial direction. Moreover, the number of the magnet-receiving holes 24 per layer may be set to be the same for all the layers. Alternatively, the number of the magnet-receiving holes 24 formed in a radially outer layer may be set to be different from the number of the magnet-receiving holes 24 formed in a radially inner layer. The same applies to the permanent magnets 22.

Figure 10A:
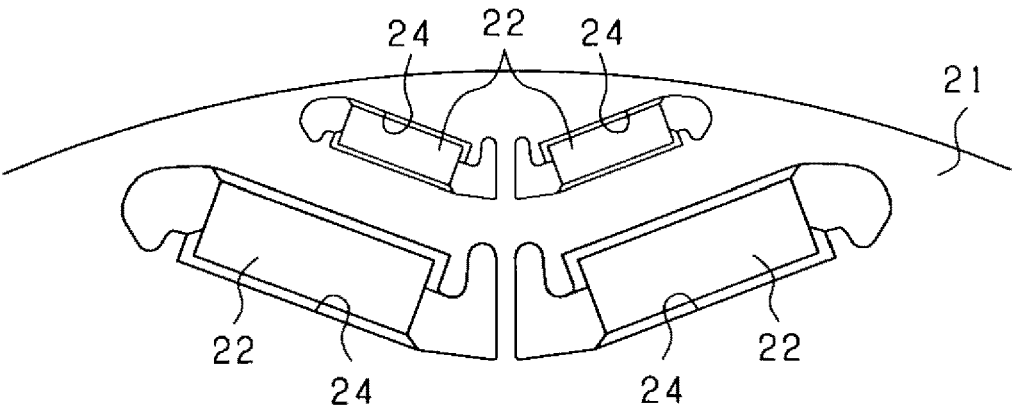

For example, as shown in FIG. 10A, for each of the magnetic poles of the rotor 12, there may be formed, in the rotor core 21, two pairs of magnet-receiving holes 24 in two layers in the radial direction. Each pair of the magnet-receiving holes 24 forms a substantially V-shape that opens toward the radially outer periphery of the rotor core 21.

Figure 10B:
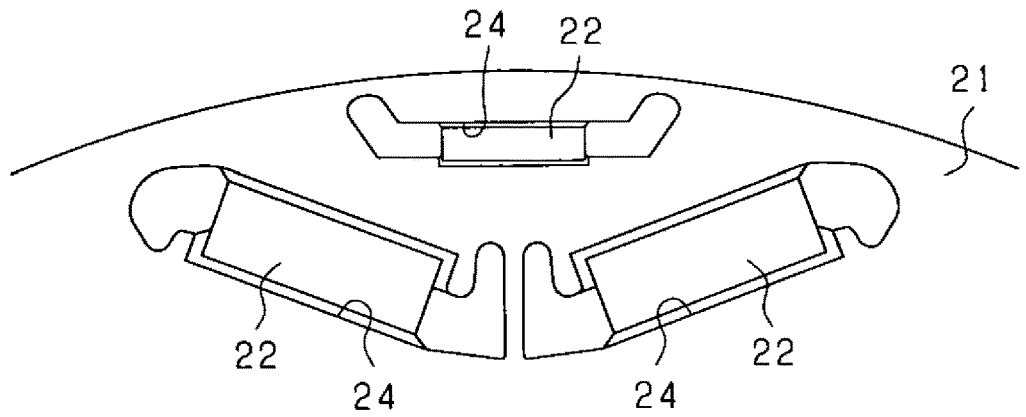

Alternatively, as shown in FIG. 10B, for each of the magnetic poles of the rotor 12, there may be formed a pair of radially-inner magnet-receiving holes 24 and a single radially-outer magnet-receiving hole 24 in the rotor core 21. The pair of radially-inner magnet-receiving holes 24 forms a substantially V-shape that opens toward the radially outer periphery of the rotor core 21. The radially-outer magnet-receiving hole 24 is formed, on the radially outer side of the pair of radially-inner magnet-receiving holes 24, to extend in a direction perpendicular to the d-axis.

Figure 10C:
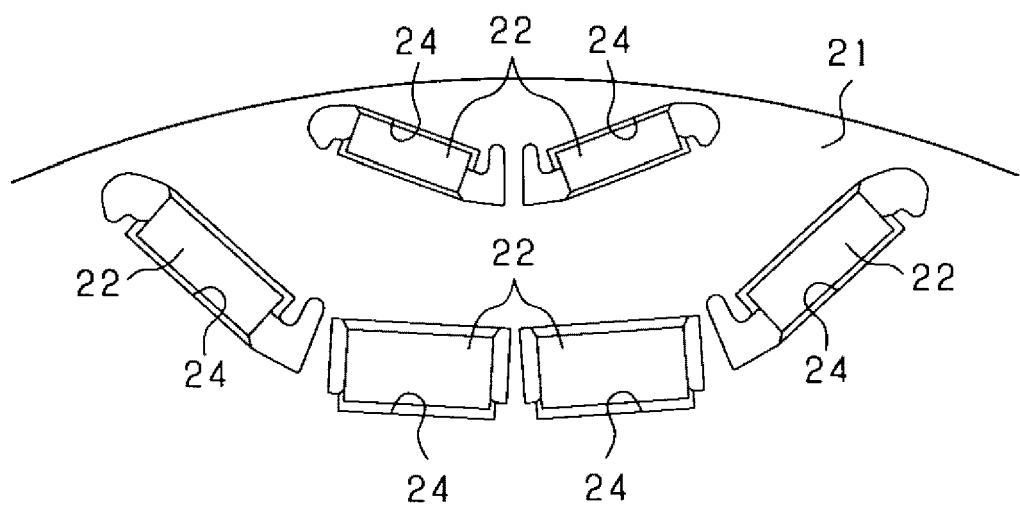

Alternatively, as shown in FIG. 10C, for each of the magnetic poles of the rotor 12, there may be formed a pair of radially-outer magnet-receiving holes 24 and four radially-inner magnet-receiving holes 24. The pair of radially-outer magnet-receiving holes 24 forms a substantially V-shape that opens toward the radially outer periphery of the rotor core 21. The four radially-inner magnet-receiving holes 24 are arranged to surround the pair of radially-outer magnet-receiving holes 24 from the radially inner side thereof.

(6) In the above-described embodiments, the rotating electric machine 10 is configured as an inner rotor type rotating electric machine. Alternatively, the rotating electric machine 10 may be configured as an outer rotor type rotating electric machine where a rotor is rotatably provided radially outside a stator.

What is claimed is:

1. A rotor for a rotating electric machine, the rotor comprising:

a rotor core having a plurality of magnet-receiving holes formed along a circumferential direction; and a plurality of permanent magnets each of which is received in a corresponding one of the magnet-receiving holes of the rotor core, wherein each of the magnet-receiving holes has a radially-outer wall surface and a radially-inner wall surface that are radially opposite to each other, each of the permanent magnets is fixed in the corresponding magnet-receiving hole of the rotor core by a fixing resin that includes a radially outer resin interposed between the permanent magnet and the radially-outer wall surface of the corresponding magnet-receiving hole and a radially inner resin interposed between the permanent magnet and the radially-inner wall surface of the corresponding magnet-receiving hole, an adhesive strength of the radially outer resin between the permanent magnet and the radially-outer wall surface of the corresponding magnet-receiving hole is higher than an adhesive strength of the radially inner resin between the permanent magnet and the radially-inner wall surface of the corresponding magnet-receiving hole, and the radially outer resin is higher in degree of cure than the radially inner resin.

2. The rotor as set forth in claim 1, wherein the radially outer resin and the radially inner resin are different in at least one of material composition and compounding ratio from each other.

3. The rotor as set forth in claim 1, wherein an application area of the radially outer resin on the radially-outer wall surface of the corresponding magnet-receiving hole is greater than an application area of the radially inner resin on the radially-inner wall surface of the corresponding magnet-receiving hole.

4. The rotor as set forth in claim 1, wherein the adhesive strength of the radially inner resin at a first interface is different from the adhesive strength of the radially inner resin at a second interface, the first interface being an interface between the radially-inner wall surface of the corresponding magnet-receiving hole of the rotor core and the radially inner resin, the second interface being an interface between the permanent magnet and the radially inner resin.

5. The rotor as set forth in claim 1, wherein the rotor is configured to be radially opposed to a stator of the rotating electric machine, the rotor has a plurality of magnetic poles each of which is formed of a corresponding pair of the permanent magnets, for each of the magnetic poles of the rotor, a corresponding pair of the magnet-receiving holes of the rotor core, in which the corresponding pair of the permanent magnets forming the magnetic pole are respectively received, are located respectively on opposite circumferential sides of a center of the magnetic pole and together form a substantially V-shape that opens toward the stator side and spreads from the center of the magnetic pole to both circumferential sides thereof, and for each of the permanent magnets, the adhesive strength of a first part of the radially inner resin is set to be higher than the adhesive strength of a second part of the radially inner resin, the first part being located further than the second part from the center of the corresponding magnetic pole.

6. A method of manufacturing a rotor for a rotating electric machine, the rotor comprising:

a rotor core having a plurality of magnet-receiving holes formed along a circumferential direction, each of the magnet-receiving holes having a radially-outer wall surface and a radially-inner wall surface that are radially opposite to each other; and a plurality of permanent magnets each of which is received in a corresponding one of the magnet-receiving holes of the rotor core, the method comprising:

an assembly step of assembling (i) the permanent magnets in a state of having not been magnetized and (ii) a fixing resin in a state of having not been cured into the magnet-receiving holes of the rotor core so that each of the permanent magnets is received in the corresponding magnet-receiving hole with the fixing resin applied on the radially-outer and radially-inner wall surfaces of the corresponding magnet-receiving hole;

a curing step of curing the fixing resin in the magnet-receiving holes of the rotor core so that each of the permanent magnets is fixed in the corresponding magnet-receiving hole by the fixing resin that includes a radially outer resin interposed between the permanent magnet and the radially-outer wall surface of the corresponding magnet-receiving hole and a radially inner resin interposed between the permanent magnet and the radially-inner wall surface of the corresponding magnet-receiving hole; and a magnetization step of magnetizing, after the curing step, each of the permanent magnets by applying a magnetic field to the permanent magnet in a direction perpendicular to both a radially-outer side surface and a radially-inner side surface of the permanent magnet, the radially-outer and radially-inner side surfaces of the permanent magnet respectively facing the radially-outer and radially-inner wall surfaces of the corresponding magnet-receiving hole, wherein in the curing step, the fixing resin is cured so that an adhesive strength of the radially outer resin between each of the permanent magnets and the radially-outer wall surface of the corresponding magnet-receiving hole is higher than an adhesive strength of the radially inner resin between each of the permanent magnets and the radially-inner wall surface of the corresponding magnet-receiving hole, and in the curing step, the fixing resin is cured so that the radially outer resin is higher in degree of cure than the radially inner resin.

7. The method as set forth in claim 6, wherein the fixing resin is formed of a resin material that is curable by thermal energy or light energy, in the curing step, the fixing resin is cured by applying thermal energy or light energy thereto such that the amount of thermal energy or light energy applied to the radially outer resin is greater than the amount of thermal energy or light energy applied to the radially inner resin.

8. The method as set forth in claim 7, wherein in the curing step, the fixing resin is cured by applying thermal energy or light energy to the fixing resin from a radially outer side of the rotor core.

9. The method as set forth in claim 8, further comprising an arrangement step of arranging, before the curing step, a stator of the rotating electric machine on the radially outer side of the rotor core, the stator including a stator coil, wherein in the curing step, the fixing resin is cured by thermal energy generated by energization of the stator coil.

* * * * *